United States Patent
Kanagarathinam et al.

(10) Patent No.: US 11,368,365 B2
(45) Date of Patent: Jun. 21, 2022

(54) METHODS AND SYSTEMS FOR DETERMINING ICN CAPABILITY OF A NODE/SERVER

(71) Applicant: Samsung Electronics Co., Ltd., Suwon-si (KR)

(72) Inventors: Madhan Raj Kanagarathinam, Bangalore (IN); Shiva Souhith Gantha, Bangalore (IN); Anshuman Nigam, Bangalore (IN); Karthikeyan Arunachalam, Bangalore (IN); Sunghee Lee, Suwon-si (KR); Sujith Rengan Jayaseelan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 17/079,292

(22) Filed: Oct. 23, 2020

(65) Prior Publication Data

US 2021/0126829 A1    Apr. 29, 2021

(30) Foreign Application Priority Data

Oct. 25, 2019  (IN) .............................. 201941043491
Oct. 1, 2020   (IN) .............................. 201941043491

(51) Int. Cl.
*G06F 15/173*    (2006.01)
*H04L 41/0866*   (2022.01)
(Continued)

(52) U.S. Cl.
CPC .......... *H04L 41/0866* (2013.01); *H04L 41/12* (2013.01); *H04L 61/1511* (2013.01)

(58) Field of Classification Search
CPC ... H04L 41/0866; H04L 41/12; H04L 61/1511
See application file for complete search history.

(56) References Cited

U.S. PATENT DOCUMENTS 8,955,036 B2   2/2015  Hugard, IV et al.
9,742,866 B2*  8/2017  Shribman ............... H04L 67/06
(Continued)

FOREIGN PATENT DOCUMENTS

WO    2014/106497 A1    7/2014
WO    2017156231 A1     9/2017
WO    2018/095531 A1    5/2018

OTHER PUBLICATIONS

Intellectual Property India, "Examination report under sections 12 & 13 of the Patents Act" dated Dec. 2, 2021, in connection with Indian Patent Application No. 201941043491, 7 pages.
(Continued)

*Primary Examiner* — Thanh T Nguyen

(57) ABSTRACT

Methods and systems for determining ICN capability of a node/server. The ICN capability is determined based on DNS resource records or TCP options. The DNS resource records are DNS queries that are sent to a DNS server, for determining the ICN capability of the server. The DNS query includes a content to indicate the intent to determine the ICN capability. If the server is having ICN capability, a DNS response is received from the DNS server, which includes the content that is identical to the content in the DNS query. A server is selected, amongst multiple servers, for transferring ICN packets, based on locations and priorities of the multiple servers, indicated in DNS responses, and an order of issuance of DNS queries to the DNS server. TCP options in the header of TCP packets are used for determining ICN capability of the nodes/servers and parameters pertaining to the ICN capability.

18 Claims, 9 Drawing Sheets

(51) Int. Cl.
*H04L 61/4511* (2022.01)
*H04L 41/12* (2022.01)

(56) References Cited

U.S. PATENT DOCUMENTS

| | | | |
|---|---|---|---|
| 2010/0185756 A1 | 7/2010 | Cheng et al. | |
| 2017/0286461 A1* | 10/2017 | Sevilla | G06F 16/22 |
| 2018/0145876 A1* | 5/2018 | Palankar | H04L 67/2842 |
| 2018/0270300 A1* | 9/2018 | Reznik | H04L 69/169 |

OTHER PUBLICATIONS

International Search Report dated Feb. 3, 2021 in connection with International Patent Application No. PCT/KR2020/014309, 3 pages.
Written Opinion of the International Searching Authority dated Feb. 3, 2021 in connection with International Patent Application No. PCT/KR2020/014309, 4 pages.

* cited by examiner

TCP Option 34:

| 00 | 01 | 02 | 03 | 04 | 05 | 06 | 07 | 08 | 09 | 10 | 11 | 12 | 13 | 14 | 15 |
|----|----|----|----|----|----|----|----|----|----|----|----|----|----|----|----|
| Kind = 34 (ICN) | | | | | | | | | | | Length | | | | |
| ICN Value | | | | | | | | | | | | | | | |

| Value | Symbol | Name |
|-------|--------|------|
| 0x0 | ICN_CAPABLE | ICN Capability |
| 0x1 | ICN_CNAME | ICN Content Name |
| 0x2 | ICN_MULTIPATH | ICN Mobility detail |
| 0x3 | RESERVED | Reserved for future |
| 0xF | ICN_PRIVATE | Private use within ICN |

FIG.7

METHODS AND SYSTEMS FOR DETERMINING ICN CAPABILITY OF A NODE/SERVER

CROSS REFERENCE TO RELATED APPLICATION

This application is based on and claims priority under 35 U.S.C. § 119(a) to Indian Patent Application No. 201941043491 (PS) filed on Oct. 25, 2019, and Indian Patent Application No. 201941043491 (CS) filed on Oct. 1, 2020 in the Indian Patent Office, the disclosures of which are herein incorporated by reference in their entirety.

BACKGROUND

1. Field

Embodiments herein relate to Information Centric Networking (ICN), and more particularly to methods and systems for determining ICN capability of a node/server.

2. Description of Related Art

Information Centric Networking (ICN) allows a device to retrieve data, irrespective of the source from where the data is being retrieved. The network, in which ICN is used for data transfer, is referred to as a Content Centric Network (CCN). ICN does not restrict a source (client) device to send the address of a destination (server) in an ICN packet for retrieving data. The source device can send an ICN packet to a (CCN) node, which includes a 'content name' field, in place of the source address and the destination address. The contents in the 'content name' field can indicate the type of data that a user of the source device intents to retrieve. The node can be considered to be an ICN router, which is having caching capabilities.

The node can refer to the received ICN packet as an interest packet. The node can include a content store, a pending interest table, and a forwarding information base. The node can store different types of contents in the content store. The node can determine whether information in the 'content name' field matches with any content in the content store. If a match is found, the node can send the matching content to the source device. If a match is not found, the node can store the interest packet in the pending interest table. The node may wait for another source device, which intends to retrieve the same content. The node forwards the interest packet to the forwarding information base. The forwarding information base can obtain the data from the server that is having the data requested by the source devices in the interest packets.

The node can store the data in the content store and forward the data to the source devices. If another source device requests for the same data, the node can send the data from the content store. This reduces the latency or Round-trip Time (RTT) involved in the transfer of data, particularly if the server is far from the source device, compared to the node. However, if the node and/or the server do not support ICN, and the source device sends ICN packets, the ICN packets will be discarded by the node and/or the server. Further, the source device computes ICN headers and adds the ICN headers to generate the ICN packet. If the node and/or the server do not support ICN, the computation of the headers, by the source device, can contribute to the loss of bandwidth, throughput, power, and so on.

SUMMARY

One object of the embodiments herein is to disclose methods and systems for determining Information Centric Networking (ICN) capability of a node/server in a communication network, based on at least one of a Domain Name Server (DNS) resource record and Transfer Control Protocol (TCP) options.

Another object of the embodiments herein is to provide a DNS query format to send a DNS query to a DNS server, for determining the ICN capability of the server, wherein the DNS query format includes a 'type' field, wherein the content in the 'type' field can indicate the intent of a client device to determine whether the server is capable of providing ICN service.

Another object of the embodiments herein is to determine the ICN capability of the server based on a DNS response received from the DNS server, wherein the DNS response includes content, which is identical to the content in the 'type' field of the DNS query, if the server is having ICN capability.

Another object of the embodiments herein is to introduce application level changes in the applications in the client device or use an application abstraction framework, to send the DNS query to the DNS server when an application/service is launched or data relevant to the application/service needs to be transferred.

Another object of the embodiments herein is to select a server, amongst a plurality of servers having ICN capabilities, for transferring ICN data packets, based on at least one of locations of the plurality of servers, priorities of the plurality of servers, and an order of issuance of DNS queries to the DNS server, wherein the locations and priorities of the plurality of servers are indicated in the DNS responses corresponding to the plurality of servers.

Another object of the embodiments herein is to enable the client device to transfer data packets, belonging to at least one service of at least one application, using at least one of ICN and Internet Protocol (IP), based on the determined capability of at least one server to provide the at least one service using ICN, and the at least one location and at least one priority of the at least one server.

Another object of the embodiments herein is to utilize a TCP option, in the header field of a TCP packet, to determine the ICN capability of the server and information about parameters that pertain to the ICN capability of the server, wherein the intent of the client device to determine the ICN capability of the server, or the information about the parameters pertaining to the ICN capability, can be indicated in a value field of the TCP option.

Accordingly, the embodiments provide methods and systems for determining, by a client device or a client node, whether a server or at least one intermediate node, between the client device and the server, supports Information Centric Networking (ICN) or is having capability to provide services using ICN. In an embodiment, the ICN capability of the server can be determined based on Domain Name Server (DNS) resource records. In another embodiment, the ICN capability of the at least one intermediate node can be determined using Transfer Control Protocol (TCP) options.

If the ICN capability of the server is determined using DNS resource record, the embodiments include sending DNS queries to a DNS server, which include an ICN-Resolution and Path Discovery (IRP) resource record. In an embodiment, applications in the client device can sent IRP resource records. The applications can be enabled to send IRP resource records by introducing changes at the application levels. Once the changes are introduced, different applications in the client device can issue DNS queries, which include the IRP resource records, to the DNS server, for determining whether the server is having ICN capability. In another embodiment, the client device can include an application abstraction framework. The ICN capability of the server can be determined by the application abstraction framework by issuing DNS queries to the DNS server. The DNS queries issued by the application abstraction framework include IRP resource records. The application abstraction framework may be supported by a network operator, which provides data services and/or other services to the client device. The DNS server can be preconfigured with information pertaining to the ICN capabilities of different servers and the abilities of the servers to provide different types of services using ICN.

If changes are introduced at the application level, then the embodiments include issuing at least one DNS query, wherein the at least one DNS query is issued when at least one application is launched. The embodiments include sending the at least one DNS query to the DNS server. Each of the at least one DNS query can include an IRP resource record. The embodiments include configuring a format for the DNS query, wherein the format includes the IRP resource record. The DNS query format is includes a 'type' field for specifying the IRP resource record. In an embodiment, the 'type' field can be configured to IRP, which indicates that the client device is intending to determine whether the server is having ICN capability.

On the other hand, if changes are not introduced at the application levels, the application abstraction framework determines whether the server has ICN capability. The application abstraction framework can obtain a list of applications in the client device, which can establish connections with respective application servers for transfer of data using ICN protocol. The application abstraction framework is connected to an edge server, which operates on the IRP platform. The edge server can provide services belonging to the applications, in the list, using ICN. When at least one application is launched, the application abstraction framework can send at least one DNS query to the DNS server, in order to determine whether the server can provide services using ICN. Each of the at least one DNS query sent to the DNS server includes an IRP resource record.

When the DNS server receives the at least one DNS query, the DNS server can send at least one DNS response. The embodiments include configuring a response format, wherein the response format can include an IRP resource record at the end of the at least one DNS response. When the client device receives the at least one DNS response, the embodiments include checking whether the at least one DNS response includes the IRP resource record. If the at least one DNS response includes the IRP resource record, the embodiments include determining that the server is capable of providing services using ICN.

The embodiments include sending ICN packets to the server if the at least one DNS response includes the at least one IRP resource record. On the other hand, if the at least one DNS response includes the at least one IRP resource record, the embodiments include determining that the server does not have ICN capability. The embodiments include sending data packets to the server using Internet Protocol (IP) or any other protocol.

The embodiments include selecting a server, if a plurality of servers is determined to have ICN capability, based on a plurality of DNS responses corresponding to the plurality of servers. The selection of an appropriate server is based on at least one of: locations of the plurality of servers and the priorities of the plurality of servers. If the locations and the priorities of at least two servers are determined to be same, the embodiments includes selecting the server, for transferring ICN packets, based on an order of issuance of a plurality of DNS queries, to the DNS server, to determine the ICN capability of the plurality of servers.

The embodiments include selecting a server without ICN capability, if it is determined that the locations of the plurality of servers with ICN capability are far from the client device, compared to the location of the server without ICN capability.

If the ICN capabilities of the at least one intermediate node and the server is determined based on TCP options, the embodiments include utilizing a TCP packet for determining the ICN capabilities of the at least one intermediate node and the server. The embodiments include utilizing a TCP option in the header field of the TCP packet. The 'kind' field of the TCP option can be configured to convey to the recipient of the TCP packet, i.e., the at least one intermediate node and/or the server, that the client device intends to determine, through the TCP packet, whether the at least one intermediate node and/or the server is having ICN capability. The TCP option in the header of the TCP packet further includes a value, which can specify whether the client device intents to determine ICN capabilities or parameters pertaining to the ICN capability of the at least one intermediate node and/or the server. When the at least one intermediate node and/or the server receives the TCP packet, the at least one intermediate node and/or the server can send at least one TCP ACK packet to the client device. If the at least one intermediate node and/or the server is having ICN capability, then the TCP ACK includes the TCP option. Based on the presence or absence of the TCP option in the TCP ACK packet, the ICN capability can be determined, and ICN, IP, or any other protocol can be used for transfer of data between the client device and server.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Embodiments herein are illustrated in the accompanying drawings, through out which like reference letters indicate corresponding parts in the various figures. The embodiments herein will be better understood from the following description with reference to the drawings, in which:

FIG. 7 illustrates an example scenario depicting the determination of ICN capabilities of an application server based on values in the 'value' field of a TCP option in the header of a TCP packet, according to embodiments as disclosed herein.

DETAILED DESCRIPTION

Figure 1A:
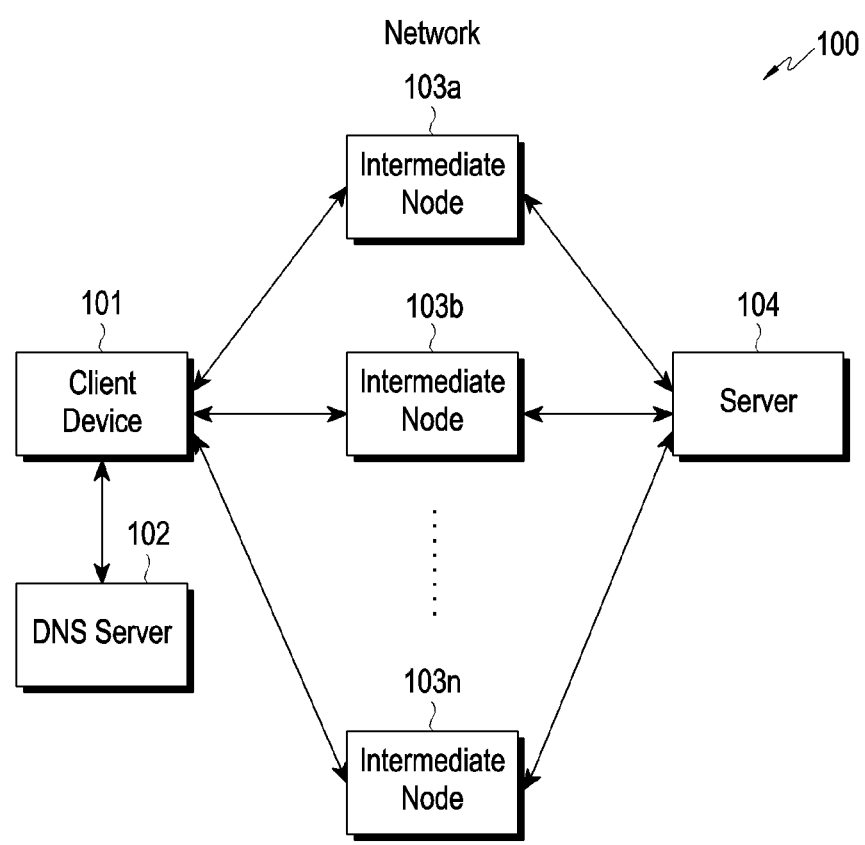
FIG. 1A illustrates a network comprising a client device, a DNS server, a plurality of intermediate nodes, and a server, wherein the client device is configured to determine whether the plurality of intermediate nodes and the server are having ICN capabilities, according to embodiments as disclosed herein.

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for determining Information Centric Networking (ICN) capability of a node/server in a communication network. The node can be an intermediate node between a client device and the server. The embodiments include determining the ICN capability based on at least one of a Domain Name Server (DNS) resource record and Transfer Control Protocol (TCP) options. In an embodiment, DNS queries can be sent to a DNS server, to determine the ICN capability of the server to provide different types of services. The embodiments include providing a DNS query format, for sending the DNS queries. The DNS queries include DNS resource records, and based on the presence or absence of the DNS resource records in DNS responses, the ICN capabilities of the server can be determined. In an embodiment, the DNS query format includes a 'type' field, for specifying the DNS resource record, which can indicate the intent of a client device to determine whether the server is capable of providing services using ICN.

In an embodiment, the DNS queries can be issued by the applications in the client device, when the applications are launched by users of the client device. The embodiments include introducing application level changes in the applications in the client device to enable the applications in the client device to issue the DNS queries. In another embodiment, the DNS queries can be issued by an application abstraction framework. The application abstraction framework included in the client device and can be supported by a network operator that is providing data services to the client device. The application abstraction framework can send a DNS query to the DNS server when an application, or a particular type of service provided by the application, is launched, or data relevant to the application/service needs to be transferred.

The embodiments include receiving DNS responses from the DNS server, wherein presence/absence of the DNS resource records in the DNS responses can indicate whether the server is capable of providing different types of services using ICN. The DNS server is configured to operate in ICN platforms, and includes information that is relevant ICN capabilities in different servers. The embodiments include checking whether the DNS responses, received from the DNS server, include the DNS resource records, which are identical to the DNS resource records in the 'type' field of the DNS queries. If the DNS responses include the DNS resource records, the embodiments include determining that the servers are capable of providing ICN services.

The embodiments include selecting a server, amongst a plurality of servers, for transferring ICN data packets, based on at least one of locations and priorities of the plurality of servers, as indicated in the DNS responses; and an order of issuance of DNS queries to the DNS server for determining the ICN capabilities of the plurality of servers. The embodiments enable the client device to transfer packets belonging to the at least one application using at least one of ICN and Internet Protocol (IP), based on at least one of: determined ICN capability of the at least one intermediate node/server, and the locations of the plurality of servers.

The embodiments include utilizing a TCP option in the header of a TCP packet for determining the ICN capabilities of the intermediate nodes and the servers, and information pertaining to parameters pertaining to the ICN capabilities of the intermediate nodes and the servers. In an embodiment, values can be configured by the client device for expressing intents to the intermediate nodes and the servers for determining the ICN capabilities. The values can indicate whether the client device intents to determine the ICN capabilities of the intermediate nodes and the servers or intents to obtain information about parameters relevant to the ICN capabilities. The values can be indicated in the value field of a TCP option in the header of the TCP packet. On receiving the TCP packet, the intermediate nodes and the servers can determine, based on the values, whether the client device intends to determine the ICN capabilities or the parameters relevant to the ICN capabilities. The intermediate nodes and the servers send TCP ACK packets, wherein the header of the TCP ACK packet includes the TCP option, if the intermediate nodes and the servers have ICN capabilities.

Referring now to the drawings, and more particularly to FIGS. 1A through 7, where similar reference characters denote corresponding features consistently throughout the figures, there are shown preferred embodiments.

FIG. 1A illustrates a network 100 comprising of a client device 101, a DNS server 102, a plurality of intermediate nodes 103a-103n, and a server 104, wherein the client device 101 is configured to determine whether the plurality of intermediate nodes 103a-103n and the server 104 are having ICN capabilities, according to embodiments as disclosed herein. As depicted in FIG. 1, the plurality of intermediate nodes 103a-103n provide paths for transfer of data between the client device 101 and the server 104 using ICN (if the plurality of intermediate nodes 103a-103n provide support for ICN). In an embodiment, the capability of the server 104 to provide services using ICN can be determined based on DNS resource records. In another embodiment, ICN capabilities of the plurality of intermediate nodes 103a-103n and the server 104 can be determined based on TCP options.

In a first embodiment, the client device 101 can send the DNS resource records to the DNS server 102, for ascertaining whether the server 104 can provide ICN services. The DNS resource records are included in the DNS queries that are sent by the client device 101 to the DNS server 102 for determining whether the server 104 is having ICN capabilities to provide services using ICN. In an embodiment, the DNS queries can include ICN-Resolution and Path Discovery (IRP) resource records. The IRP resource records in each of the DNS queries can indicate to the DNS server 102 that the client device 101 intents to determine the ICN capability of the server 104.

The DNS server 102 can send DNS responses, which can indicate whether the server 104 is capable of providing different types of services using ICN. When the client device 101 receives the DNS responses from the DNS server 102, the client device 101 determines whether the DNS responses include the IRP resource records. If the server 104 is having ICN capability, then the DNS responses, received from the DNS server 102, include the IRP resource records. If the server 104 does not support ICN, then the DNS responses, received from the DNS server 102, will not include the IRP resource records.

If the client device 101 determines that a plurality of servers (including the server 104) are having ICN capabilities, then client device 101 can select a server amongst the plurality of servers. A plurality of DNS responses corresponding to the plurality of servers includes the locations and the priorities of the plurality of servers. The client device 101 can select a server (say server 104), amongst plurality of servers. In an embodiment, the selection of the server (104) is based on locations and priorities of the plurality of servers, indicated in plurality of DNS responses, and an order of issuance of the plurality of DNS queries to the DNS server 102. The selected server (104) can be used for transfer of ICN packets between the client device 101 and the server (104).

In a second embodiment, the client device 101 can utilize TCP options to determine the ICN capabilities of the plurality of intermediate nodes 103a-103n and the server 104. The TCP options are included in the headers of TCP packets. The client device 101 can indicate, in a particular TCP option, to the plurality of intermediate nodes 103a-103n and the server 104, that the client device 101 intents to determine ICN capabilities of the plurality of intermediate nodes 103a-103n and the server 104. The client device 101 can also request for information about parameters pertaining to the ICN capabilities of the plurality of intermediate nodes 103a-103n and the server 104.

The client device 101 can express the intents in the value field of the TCP option. The bits in the value field can convey whether the client device intents to determine the ICN capabilities of the plurality of intermediate nodes 103a-103n and the server 104, or the information about the parameters pertaining to the ICN capabilities of the plurality of intermediate nodes 103a-103n and the server 104. On receiving the values, the plurality of intermediate nodes 103a-103n and the server 104 can ascertain whether the client device 101 intends to determine the ICN capabilities or the parameters pertaining to the ICN capabilities.

Figure 1B:
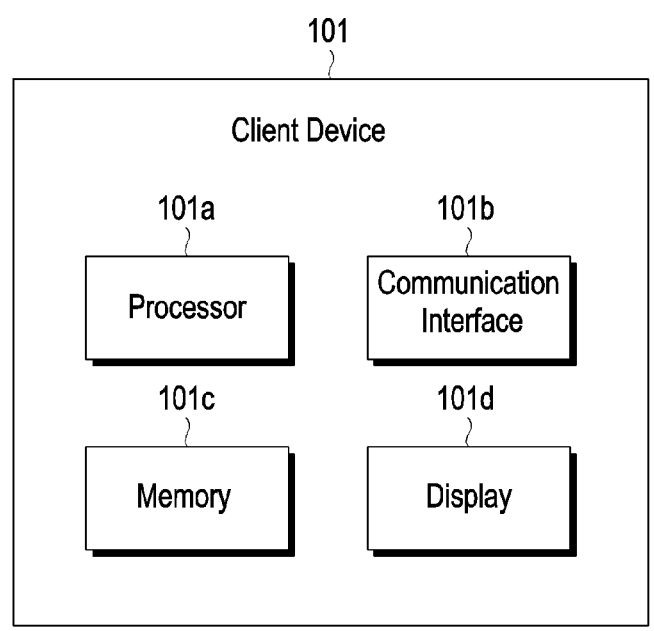
FIG. 1B illustrates various units of the client device, configured to determine the ICN capabilities of the plurality of intermediate nodes and the server, according to embodiments as disclosed herein.

FIG. 1B illustrates the various units of the client device 101, configured to determine the ICN capabilities of the plurality of intermediate nodes 103a-103n and the server 104, according to embodiments as disclosed herein. As depicted in FIG. 1B, the client device 101 includes a processor 101a, a communication interface 101b, a memory 101c, and a display 101d. Examples of the client device 101 include, but not limited to, a smart phone, a tablet, an Internet of Things (IoT device), a laptop, a personal computer (PC), a vehicle infotainment system, and so on.

The client device 101 is considered to have ICN capability. In an embodiment, the client device 101 can advertise its ICN capabilities, to the plurality of intermediate nodes 103a-103n and the server 104, using a network operator, which is providing data services or any other services to the client device 101. The client device 101 can be configured to determine the ICN capabilities of the server 104 and at least one intermediate node (103a-103n), amongst the plurality of intermediate nodes 103a-103n, through which the client device 101 intends to receive, from the server 104, data services using ICN. The client device 101 can determine the ICN capabilities of other servers (not shown). The DNS server 102 can be preconfigured with information pertaining to the ICN capabilities of the server 104 and the plurality of servers (104). The server 104 and the plurality of servers (104) can be referred to as application servers.

In an embodiment, the processor 101a determines the ICN capability of the server 104 based on an IRP resource record. The processor 101a can include the IRP resource record, which is a DNS resource record, in a DNS query and send the DNS query to the DNS server 102, to determine the ICN capability of the server 104. In an embodiment, the processor 101a can introduce changes at the application level for enabling applications to include the IRP resource record in the DNS query, for determining whether the application server 104 can provide services using ICN. In an embodiment, socket call Application Programming Interface (API) changes can be introduced at the application level for enabling the applications to include the IRP resource record in the DNS query.

The processor 101a can issue DNS queries, which include the IRP resource records, to the DNS server 102, when applications in the client device 101 are launched. The changes introduced at the application level allow the processor 101a to include the IRP resource records in the DNS queries. The processor 101a can send multiple IRP resource records to the DNS server 102, wherein each IRP resource record is utilized for determining whether the application server (104) can provide a particular type of service (such as chat, video, image, and so on) that is related to a launched application, using ICN.

In another embodiment, the client device 101 can utilize an application abstraction framework for issuing the DNS queries that include the IRP resource records, and sending the DNS queries to the DNS server 102. The application abstraction framework includes the IRP resource records in the DNS queries to determine whether the application server can provide services to the client device 101 using ICN. In an embodiment, the application abstraction framework can be included in the client device 101. The application abstraction framework can be supported by a network operator, from which the client device 101 receives data services and/or other services. The application abstraction framework can be connected to an edge server, which operates on the ICN platform.

When the client device 101 is booted, the application abstraction framework can determine a list of applications from the edge server, which can support ICN. The data pertaining to these applications can be transferred using ICN if the applications support ICN. When a user launches an application, the application abstraction framework can send an IRP resource record to the DNS server 102, to determine whether the application server 104, supports ICN. The application abstraction framework can send IRP resource records, in DNS queries, to the DNS server 102, to determine whether the application server 104 can provide different types of services using ICN.

The processor 101 can configure a format for the DNS query, which includes the IRP resource record. In an embodiment, the format of the IRP resource record can be [Universal Resource Locator (URL) type]. An example DNS query is [img2.example.com IRP]. Herein, img2.example.com is the URL and type is IRP, which is the IRP resource record. In an example, an IRP usage rule can be "Do a lookup for QNAME=domain-name, QTYPE=IRP".

The format of the DNS query includes the 'type' field, which is specified as IRP. The 'type' field can indicate that the client device 101 or the application abstraction framework is intending to determine whether the application server 104 is capable of providing services using ICN. In an embodiment, the client device 101 can send the DNS queries, including the IRP resource records, to the DNS server 102. In another embodiment, the application abstraction framework can send the DNS queries, including the IRP resource records, to the DNS server 102.

Once the DNS server 102 receives the DNS queries, which include the IRP resource records, the DNS server 102 may send DNS responses, which can be received by the applications or the application abstraction framework. The DNS server 102 sends the DNS responses in a DNS response format. The embodiments include configuring the DNS response format such that the client device 101 can determine whether the application server 104 is capable of providing intended services using ICN.

In an embodiment, the DNS response format is [#owner TTL (Time-to-Live) Class IRP {_Service._Port Latitude Longitude Priority Type Address Type}]. An example DNS response is [$ORIGIN img2.example.com-3600 IN IRP_chatexample.com._389 43.200 55.130 5 AAAA::ffff: 107.109.110.110 IRP]. Herein, ORIGIN is the owner, TTL is 3600, service is chat service (the chat service is delivered by the server named as 'example'), 389 is the port, 43.200 is the latitude, 55.130 is the longitude, 5 is the priority, type is AAAA (AAAA type denotes IPv6 (Internet Protocol version 6) address format is being used), ffff: 107.109.110.110 is the IP address, and IRP denotes that the server can provide relevant services to the client device 101.

The DNS response format includes the field 'type' at the end of the DNS response. When the client device 101 receives the DNS responses, the processor 101a can check whether the DNS responses include the IRP resource records. If the DNS responses, received from the DNS server 102, include the IRP resource records, the processor 101a can determine that the application server 104 is capable of providing services using ICN. The processor 101a can establish an ICN link with the application server 104 through at least one intermediate node (103a-103n), if the at least one intermediate node (103a-103n) supports ICN. The processor 101a can send ICN packets, through the communication interface 101b, to the application server 104.

On the other hand, if the DNS responses, received from the DNS server 102, do not include the IRP resource records, the processor 101a can determine that the application server 104 may not be able to provide the intended services using ICN. The processor 101a can send data packets to the application server 104 through the at least one intermediate node (103a-103n) using Internet Protocol (IP) or any other data transfer protocol.

Consider that the processor 101a has determined that the application server 104 is capable of providing services using ICN and the at least one intermediate node (103a-103n) supports ICN. The processor 101a can select an intermediate node (103a-103n) amongst the at least one intermediate node (103a-103n) supporting ICN. The processor 101a can send data packets to the application server 104 through selected intermediate node (103a-103n).

If the at least one intermediate node (103a-103n) does not support ICN, then the data packets are sent to the application server 104 using IP, even if the application server 104 is capable of providing services using ICN. Similarly, if the at least one intermediate node (103a-103n) supports ICN, then the data packets are sent to the application server 104 using IP, in case the application server 104 is not capable of providing services using ICN (the DNS response corresponding to the application server 104 does not include the IRP resource record).

In case the processor 101a determines that a plurality of application servers (104) can provide the intended services using ICN, the processor 101a can select an application server (104) amongst the plurality of application servers (104) to receive the services. The selection of an appropriate application server (104), amongst the plurality of application servers (104), is based on the locations of the plurality of application servers (104) and the priorities of the plurality of application servers (104).

Consider that the appropriate application server is the application server 104. The processor 101a selects the application server 104 as the location of the application server 104 is closest to the client device 101, compared to the locations of other application servers (104) capable of providing services using ICN.

If another application server (104), amongst the plurality of application servers (104), is having the same location as that of the application server 104, the processor 101a selects the application server 104, if the priority of the application server 104 is greater compared to the priority of the other application server (104).

If the processor 101a determines that the locations and the priorities of at least two application servers (104) are same, the processor 101a can select an application server (104), amongst the at least two application servers (104), based on the order of issuance of the at least two DNS queries to the DNS server 102.

The processor 101a can select an application server (104) without ICN capability, if the processor 101a determines that the location of the application server (104) without ICN capability is closer to the client device 101, compared to the location of an application server (104) capable of providing services using ICN. In an embodiment, the processor 101a can identify that the Round-Trip Time (RTT) for the application server (104) without ICN capability and the application server (104) capable of providing services using ICN. If the RTT for the application server (104) capable of providing services using ICN is higher compared to the RTT for the application server (104) without ICN capability, than the processor 101a can select the application server (104) without ICN capability for the transfer of data packets.

In an embodiment, the client device 101 can determine the ICN capabilities of the at least one intermediate node (103a-103n) and the application server 104 based on TCP options. The processor 101a can utilize a TCP packet for querying the application server 104 and the at least one intermediate node (103a-103n) about their respective ICN capabilities and parameters pertaining to the ICN capabilities of the at least one intermediate node (103a-103n) and the application server 104. Consider that the processor 101a utilizes TCP synchronize (SYN) packets for querying the at least one intermediate node (103a-103n) and the application server 104 about the ICN capabilities of the at least one intermediate node (103a-103n) and the application server 104.

The processor 101a can configure a TCP option in the header field of the TCP SYN packets for querying the at least one intermediate node (103a-103n) and the application server 104 about their respective ICN capabilities and the parameters pertaining to the ICN capabilities of the at least one intermediate node (103a-103n) and the application server 104. The TCP option can include a 'kind' field, a 'length' field, and a 'value field'. The length of the 'kind' and the 'length' fields is 1 byte, and the length of the 'value' field comprises of 2 bytes.

The 'kind' field of the TCP option can specify the number of the TCP option that is being used by the client device 101 to convey to the at least one intermediate node (103a-103n) and the application server 104, that the client device 101 intends to determine whether the at least one intermediate node (103a-103n) support ICN and whether the application server 104 can provide different types of services using ICN. The 'value' field can specify whether the client device 101 is intending to determine the ICN capabilities or the parameters pertaining to the ICN capabilities of the at least one intermediate node (103a-103n) and the application server 104.

When the TCP SYN packets are received by the at least one intermediate node (103a-103n) and the application server 104, the at least one intermediate node (103a-103n) and the application server 104 can send TCP SYN ACK packets to the client device 101. The TCP SYN ACK packets can be received by the communication interface 101b and stored in the memory 101c. The processor 101a can determine whether the TCP SYN ACK packets include the TCP option that was sent by the client device 101 in the TCP SYN packets. The presence or absence of the TCP option in the TCP SYN ACK packets can indicate whether the at least one intermediate node (103a-103n) and the application server 104 are having ICN capabilities.

If the TCP option is present in the TCP SYN ACK packets, received from the at least one intermediate node (103a-103n) and the application server 104, the processor 101a can determine that the at least one intermediate node (103a-103n) and the application server 104 are having ICN capabilities. If the TCP option is not present in the TCP SYN ACK packets the processor 101a can determine that the at least one intermediate node (103a-103n) and the application server 104 are not having ICN capabilities. The values in the 'value' field of the TCP option in the TCP SYN ACK packets will indicate the ICN capability and the parameters pertaining to the ICN capabilities of the at least one intermediate node (103a-103n) and the application server 104.

The processor 101a may establish ICN links for transferring data to the application server 104, through the at least one intermediate node (103a-103n), if the TCP SYN ACK packets, received from the at least one intermediate node (103a-103n) and the application server 104, include the TCP option. The processor 101a may use IP protocol, or other protocols, for transferring data to the application server 104 through the at least one intermediate node (103a-103n), if the TCP SYN ACK packets received from the at least one intermediate node (103a-103n) and the application server 104 do not include the TCP option.

FIG. 1B shows exemplary units of the client device 101. However, it is to be understood that other embodiments are not limited thereon. In other embodiments, the client device 101 may include less or additional number of units. Further, the labels or names of the units of the client device 101 are used only for illustrative purpose and does not limit the scope of this disclosure. One or more units can be combined to perform same or substantially similar function in the client device 101.

Figure 2A:
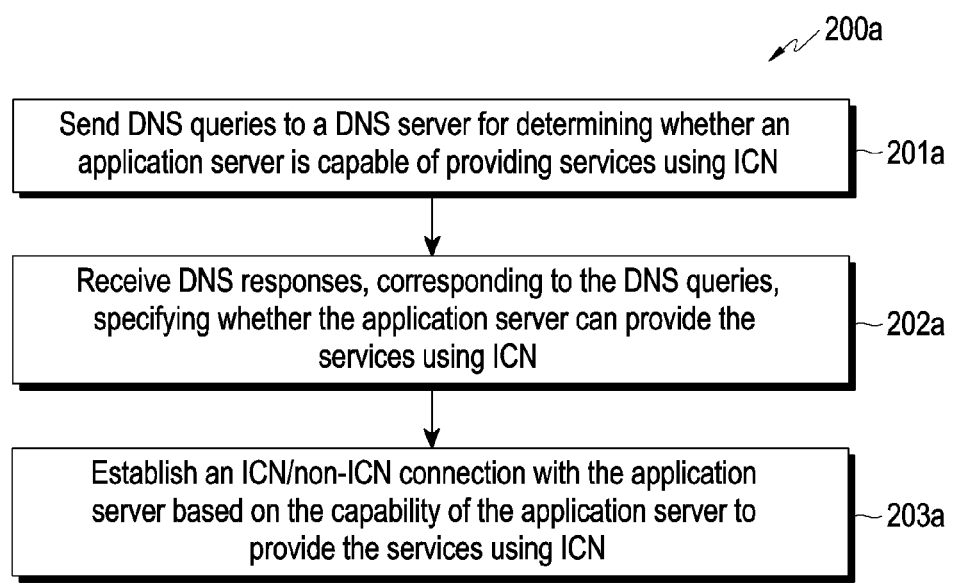
FIG. 2A illustrates a flowchart depicting a method for establishing an ICN/non-ICN connection with the application server based on presence/absence of ICN capability in the application server, according to embodiments as disclosed herein.

FIG. 2A illustrates a flowchart 200a depicting a method for establishing an ICN/non-ICN connection with the application server 104 based on presence/absence of ICN capability in the application server 104, according to embodiments as disclosed herein. At step 201a, the method includes sending DNS queries to a DNS server 102 for determining whether an application server 104 is capable of providing services using ICN. When a user launches applications, the embodiments include sending the DNS queries to the DNS server 102, in order to determine whether the server 104 is having the capability to provide intended services, pertaining to the launched applications, using ICN. The DNS queries include IRP resource records, wherein the IRP resource records are used for determining whether the application server can provide the intended services using ICN.

In an embodiment, the DNS queries can be sent by the applications. The embodiments introduce changes at the application level for enabling the applications to include IRP resource records in the DNS queries. In another embodiment, the DNS queries can be sent by the application abstraction framework. The embodiments include configuring a format for sending the DNS queries, which include the IRP resource records. The format includes a 'type' field, which indicates that the launched application or the application abstraction framework is intending to determine whether the application server 104 is capable of providing services using ICN. The embodiments include specifying the IRP resource records is in the 'type' field of the DNS queries to inform the application server 104 about the intent of determining the capability of the application server 104 in providing services using ICN.

At step 202a, the method includes receiving DNS responses, corresponding to the DNS queries, specifying whether the application server 104 can provide the services using ICN. The DNS server 102 can send the DNS responses, which can be received either by the applications or by the application abstraction framework. The DNS response format includes a 'type' field, which can indicate the capability of the application server 104 to provide the intended services using ICN. When the DNS responses are received, the embodiments include determining whether the DNS responses include the IRP resource records.

If the DNS responses, received from the DNS server 102, include the IRP resource records, the embodiments include determining that the application server 104 is capable of providing the intended services using ICN. On the other hand, if the DNS responses, received from the DNS server 102, do not include the IRP resource records, the embodiments include determining that the application server 104 is not capable of providing the intended services using ICN.

At step 203a, the method includes establishing an ICN/non-ICN connection with the application server 104 based on the capability of the application server 104 to provide the services using ICN. If it is determined that the application server 104 is capable of providing the intended services using ICN, the embodiments include establishing an ICN connection with the application server 104, through the at least one intermediate node (103a-103n), provided that the at least one intermediate node (103a-103n) support ICN. The embodiments include sending ICN packets to the application server 104 through the at least one intermediate node (103a-103n). If it is determined that the application server 104 does not have the capability to provide the intended services using ICN, the embodiments include establishing a non-ICN connection (TCP/IP) with the application server 104, through the at least one intermediate node (103a-103n). The embodiments include sending ICN packets to the application server 104 through the at least one intermediate node (103a-103n) using TCP/IP or other protocols.

The various actions in the flowchart 200a may be performed in the order presented, in a different order, or simultaneously. Further, in some embodiments, some actions listed in FIG. 2A may be omitted.

Figure 2B:
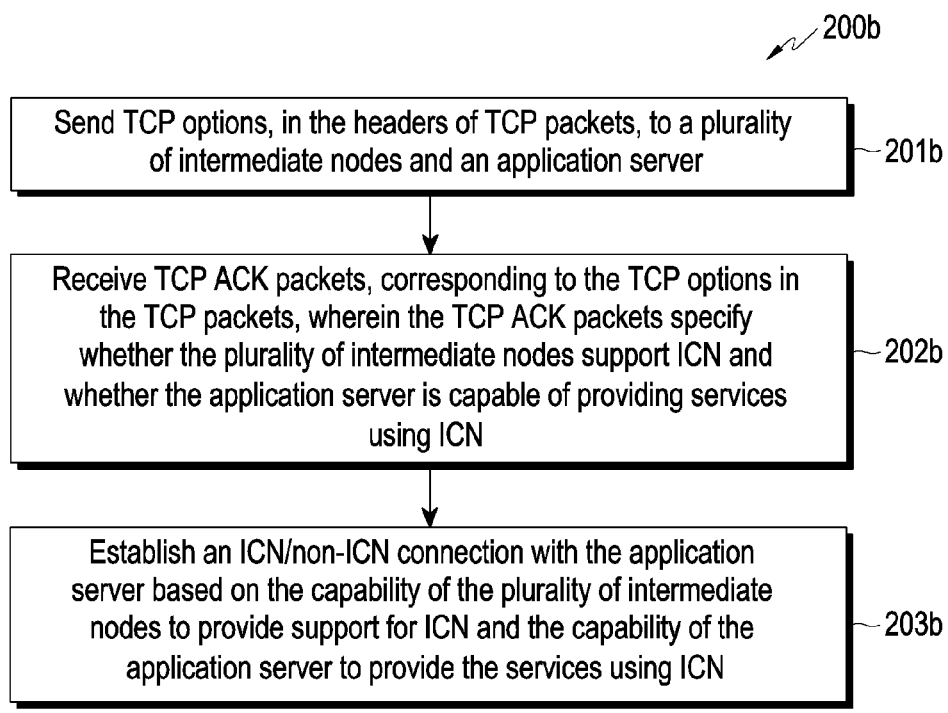
FIG. 2B illustrates a flowchart depicting a method for establishing an ICN/non-ICN connection with the application server through at least one intermediate node, based on ICN capabilities of the plurality of intermediate nodes and the application server, according to embodiments as disclosed herein.

FIG. 2B illustrates a flowchart 200b depicting a method for establishing an ICN/non-ICN connection with the application server 104 through at least one intermediate node (103a-103n), based on ICN capabilities of the plurality of intermediate nodes 103a-103n and the application server 104, according to embodiments as disclosed herein. At step 201b, the method includes sending TCP options, in the headers of the TCP packets, to the plurality of intermediate nodes 103a-103n and the application server 104. The embodiments include sending the TCP options for determining whether the plurality of intermediate nodes 103a-103n support ICN and the application server 104 is capable of providing services using ICN. The embodiments include utilizing the TCP packets for querying about the ICN capabilities of the application server 104 and the plurality of intermediate nodes 103a-103n. The TCP options can be utilized for determining information about parameters pertaining to the ICN capabilities of the plurality of intermediate nodes 103a-103n and the application server 104.

In an embodiment, the TCP options in the header of the TCP SYN packets can be used for querying the plurality of intermediate nodes 103a-103n and the server 104 about the ICN capabilities of the plurality of intermediate nodes 103a-103n and the application server 104. The 'kind' field of the TCP option can specify the number of the TCP option that is being for querying about the ICN capabilities of the plurality of intermediate nodes 103a-103n and the application server 104. The 'value' field of the TCP option can specify whether the queries are meant for determining the ICN capabilities or the parameters pertaining to the ICN capabilities of the plurality of intermediate nodes 103a-103n and the server 104.

At step 202b, the method includes receiving TCP ACK packets, corresponding to the TCP options, wherein the TCP ACK packets specify whether the plurality of intermediate nodes 103a-103n support ICN and the application server 104 is capable of providing services using ICN. The plurality of intermediate nodes 103a-103n and the server 104 can send the TCP SYN ACK packets to the client device 101. The embodiments include determining whether the TCP SYN ACK packets include the TCP option that was sent in the TCP SYN packets. The presence or absence of the TCP option in the TCP SYN ACK packets indicate whether the plurality of intermediate nodes 103a-103n support ICN and the application server 104 is capable of providing services using ICN.

If the TCP SYN ACK packets, received from the plurality of intermediate nodes 103a-103n, include the TCP option, the embodiments include determining that the plurality of intermediate nodes 103a-103n support ICN and the application server 104 is capable of providing services using ICN. If the TCP SYN ACK packets do not include the TCP option, the embodiments include determining that the plurality of intermediate nodes 103a-103n do not support ICN and the application server 104 may not be capable of providing services using ICN. The values in the 'value' field of the TCP option in the TCP SYN ACK packets specify the ICN capabilities of the plurality of intermediate nodes 103a-103n and the application server 104 or specify the parameters pertaining to the ICN capabilities of the plurality of intermediate nodes 103a-103n and the application server 104.

At step 203b, the method includes establishing an ICN/non-ICN connection with the application server 104 based on the capability of the plurality of intermediate nodes 103a-103n to provide support for ICN and the capability of the application server 104 to provide the services using ICN. The embodiments include establishing an ICN connection for transferring data to the application server 104, through the plurality of intermediate nodes 103a-103n, if the TCP SYN ACK packets include the TCP option. The embodiments include establishing a non-ICN connection for transferring data to the application server 104, through the plurality of intermediate nodes 103a-103n, if the TCP SYN ACK packets do not include the TCP option.

The various actions in the flowchart 200b may be performed in the order presented, in a different order, or simultaneously. Further, in some embodiments, some actions listed in FIG. 2B may be omitted.

Figure 3:
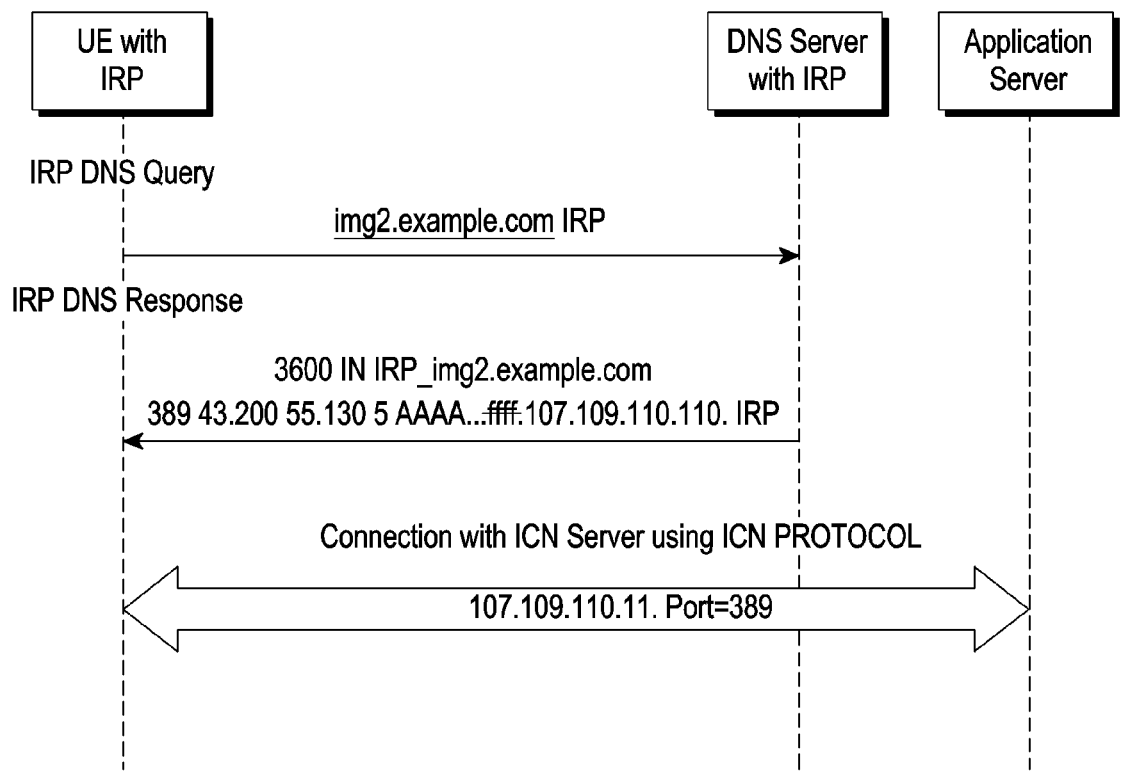
FIG. 3 illustrates an example sequence diagram depicting the establishment of an ICN connection with an application server on determining the ICN capability of the application server using IRP resource records, according to embodiments as disclosed herein.

FIG. 3 illustrates an example sequence diagram depicting the establishment of an ICN connection with an application server on determining the ICN capability of the application server 104 using IRP resource records, according to embodiments as disclosed herein. Consider that the client device 101 has introduced changes at the application level. The changes introduced at the application level allow the applications to include the IRP resource records in the DNS queries when the applications are launched. The client device 101 can issue DNS queries, which include the IRP resource records, to the DNS server 102, when applications in the client device 101 are launched. The DNS server 102 includes information pertaining to the ICN capabilities of the application server 104.

As depicted in FIG. 3, an application in the client device 101 issues a DNS query, which includes the IRP resource record. The DNS query is sent to the DNS server 102, to determine the ICN capability of the application server 104. Consider that the DNS query is [img2.example.com IRP]. The DNS query includes the IRP resource record. The IRP resource record can indicate that the client device 101 is intending to determine whether the application server 104 is capable of providing services using ICN.

Once the DNS server 102 receives the DNS query comprising of the IRP resource record, the DNS server 102 can send a DNS response. Consider that the DNS response received from the DNS server 102 is 3600 IN IRP_img2.example.com._389 43.200 55.130 5 AAAA::ffff: 107.109.110.110 IRP]. The client device 101 checks whether the DNS response includes the IRP resource records. As the DNS response includes the IRP resource record the client device 101 can determine that the application server 104 is capable of providing services using ICN. The client device 101 can establish a link with the application server 104 and send and receive ICN packets to the application server 104. If the IRP resource record is not included in the DNS response, the client device 101 determines that the application server 104 does not support ICN.

Figure 4:
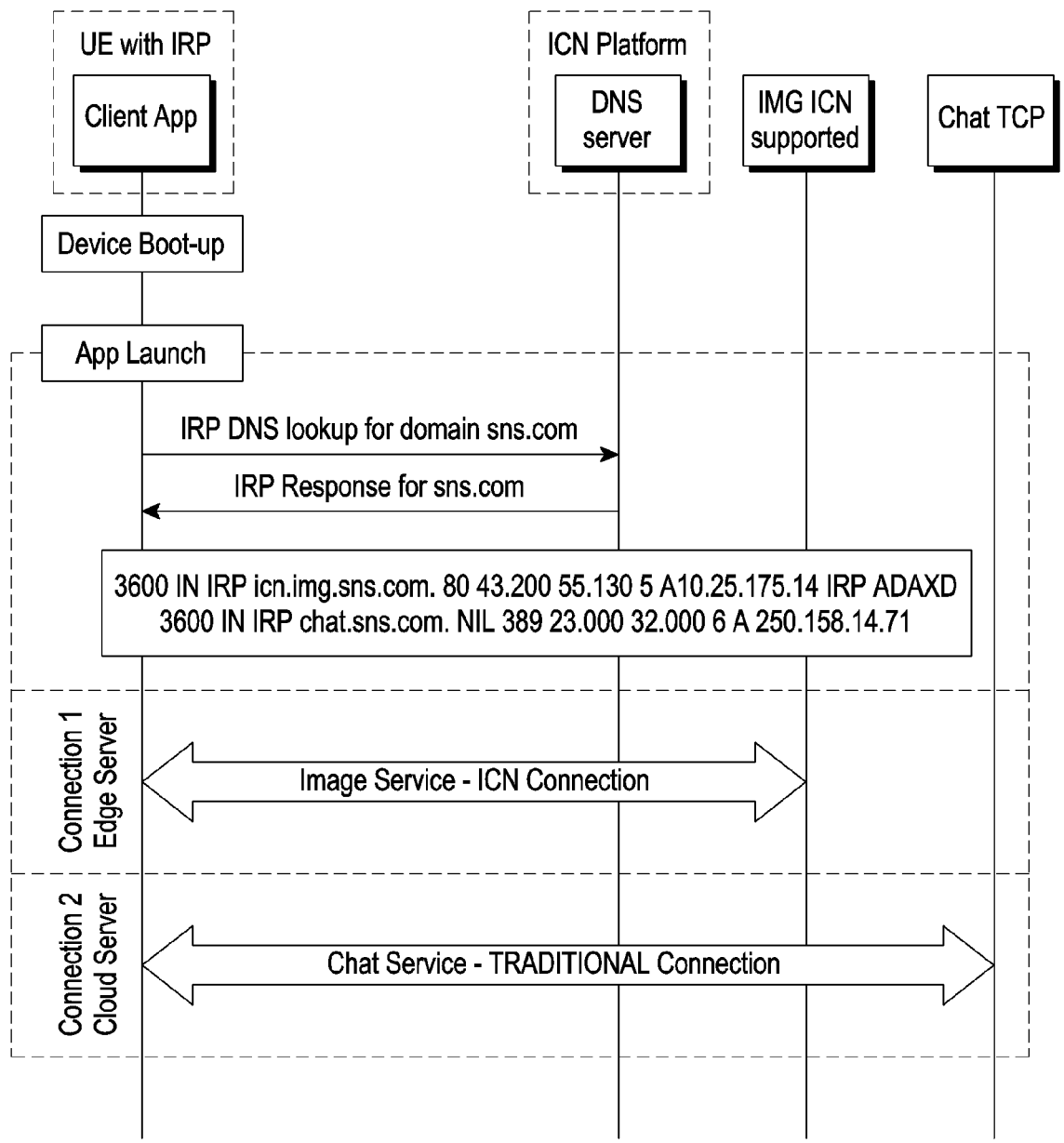
FIG. 4 illustrates an example sequence diagram depicting the establishment of an ICN connection and a legacy data connection, with application servers, based on ICN capabilities of the application servers determined using IRP resource records, according to embodiments as disclosed herein.

FIG. 4 illustrates an example sequence diagram depicting the establishment of an ICN connection and a legacy data connection, with application servers, based on ICN capabilities of the application servers determined using IRP resource records, according to embodiments as disclosed herein. Consider that the client device 101 has introduced changes at the application levels. Consider that an application has been launched and the user intents to avail an imaging service and a chat service. The imaging service and the chat service belong to the same application (sns), but require establishing unique connections with the servers, which are configured to exclusively provide the imaging service and the chat service respectively.

The application can issue two DNS queries, wherein the issued DNS queries include IRP resource records. One of the DNS queries is used for determining whether the imaging server supports ICN and is capable of providing imaging services using ICN. The other DNS query is used for determining whether the chat server supports ICN and is capable of providing chat services using ICN. As depicted in FIG. 4, the DNS queries are sent to the DNS server 102, to determine the ICN capability of the imaging server and the chat server.

On receiving the two DNS queries, the DNS server can send two DNS responses. Consider that the DNS response received from the DNS server 102 are [3600 IN IRP_icn-.img.sns.com._80 43.200 55.130 5 A 10.25.175.14 IRP] pertaining to the imaging server and [3600 IN IRP chat.sns.com NIL 389 23.000 32.000 6 A 250.158.14.71] pertaining to the chat server. The client device 101 checks whether the DNS responses include IRP resource records.

As the DNS response corresponding to the imaging server includes the IRP resource record the client device 101 can determine that the imaging server 104 is capable of providing imaging services using ICN. The client device 101 can establish an ICN connection with the imaging server to receive imaging services. As the DNS response corresponding to the chat server does not include the IRP resource record, the client device 101 can determine that the chat server 104 is not capable of providing chat services using ICN. The client device 101 can establish a TCP/IP connection with the chat server to receive chat based services.

Figure 5:
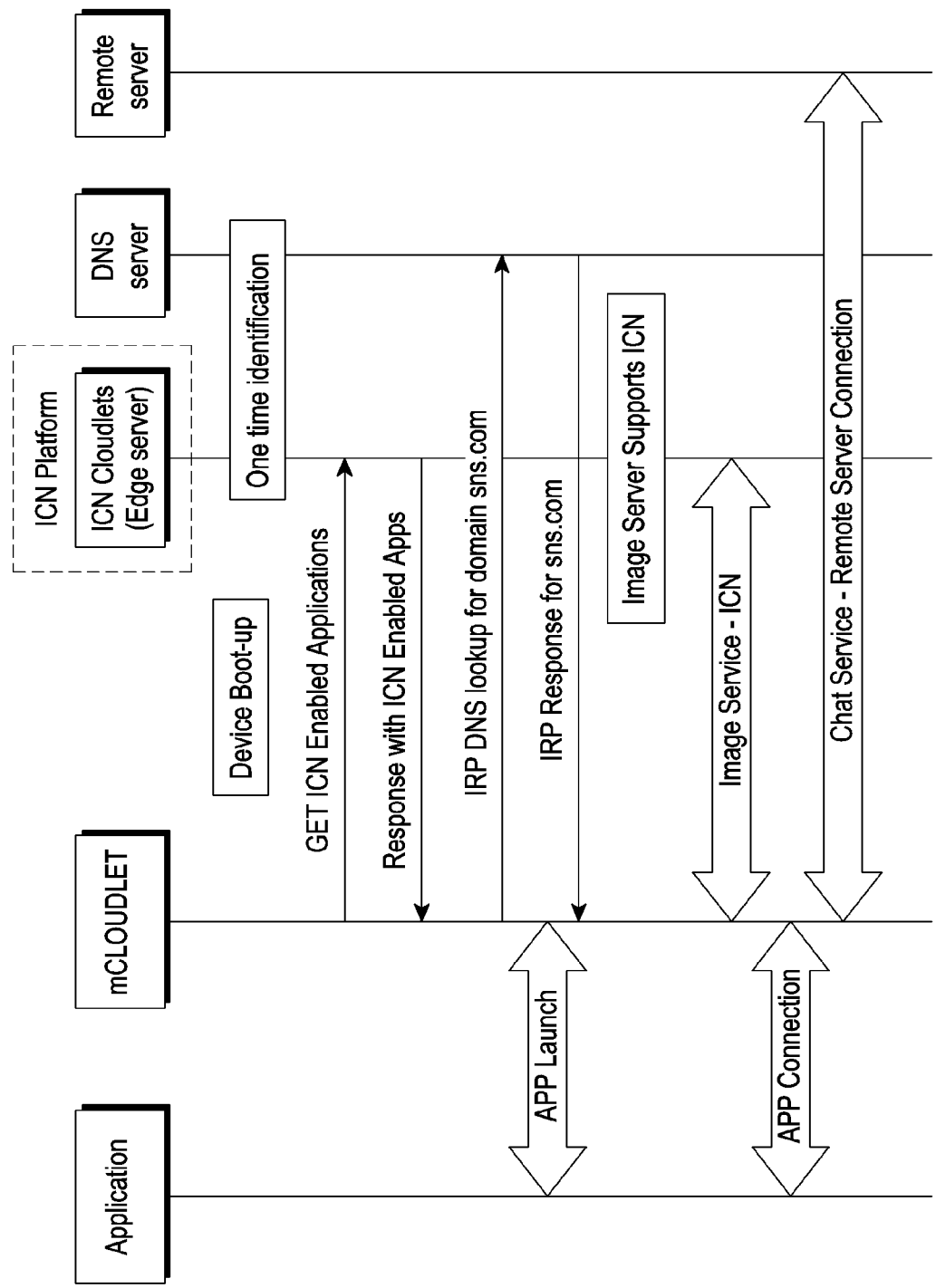
FIG. 5 illustrates an example sequence diagram depicting the establishment of an ICN connection and a non-ICN connection with application servers, based on ICN capabilities of the application servers determined using IRP resource records, according to embodiments as disclosed herein.

FIG. 5 illustrates an example sequence diagram depicting the establishment of an ICN connection and a non-ICN connection with application servers, based on ICN capabilities of the application servers determined using IRP resource records, according to embodiments as disclosed herein. As depicted in FIG. 5, the client device 101 can include an application abstraction framework for issuing the DNS queries and sending the DNS queries to the DNS server 102. In an example, the application abstraction framework is mCLOUDLET. The mCLOUDLET can issue DNS queries to determine whether the servers can provide services to the client device 101 using ICN. The mCLOUDLET can include IRP resource records in the DNS queries to determine the ICN capabilities of the servers. In an embodiment, mCLOUDLET can be supported by the network operator, from which the client device 101 receives data services and/or other services.

The mCLOUDLET can be connected to an ICN Cloudlets, i.e., an edge server, which operates on the ICN platform. When the client device 101 is booted, the mCLOUDLET determines the list of applications in the client device 101 that can establish connections using ICN. The mCLOUDLET can obtain the list of applications from the ICN Cloudlets. The applications in the list support ICN and ICN protocol can be used for transferring data that belongs to the applications. The mCLOUDLET associates with all applications in the client device 101. When a user launches an application, the application abstraction framework can send IRP resource record to the DNS server 102, to determine whether the servers providing different services belonging to the same application supports ICN.

The mCLOUDLET can issue two DNS queries, wherein the issued DNS queries include IRP resource records. One of the DNS queries is used for determining imaging services can be provided using ICN. The other DNS query is used for determining whether chat services can be availed using ICN. The DNS queries are sent to the DNS server 102, to determine the ICN capabilities. On receiving the two DNS queries from the mCLOUDLET, the DNS server 102 can send DNS responses. Based on the DNS responses, received from the DNS server 102, the mCLOUDLET determines that ICN support is available for receiving the imaging services and ICN support is not available for receiving the chat services. The mCLOUDLET can establish an ICN connection with the ICN Cloudlets server to receive the imaging services. The mCLOUDLET can establish a connection with a remote chat server using legacy data transfer protocols to receive the chat based services.

Figure 6:
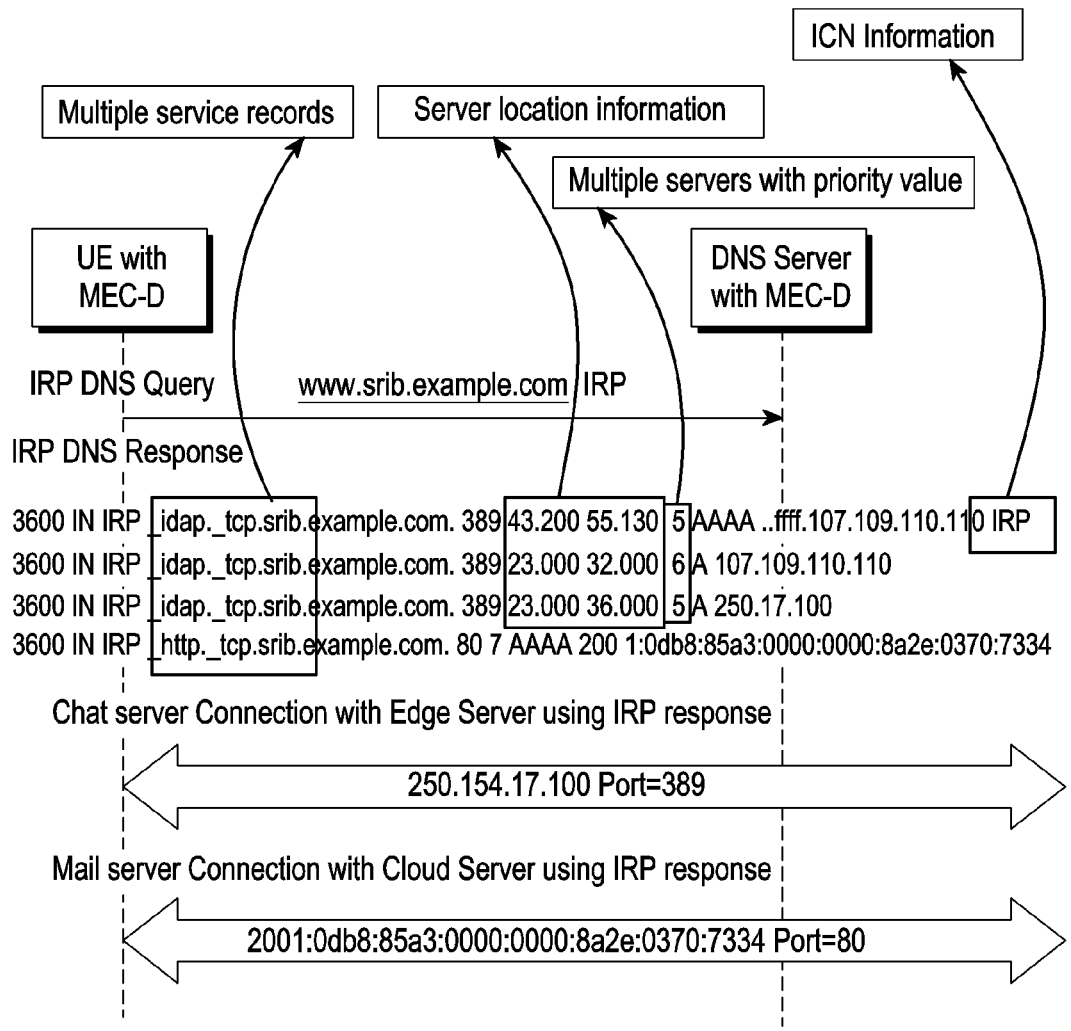
FIG. 6 illustrates an example scenario depicting the selection of an application server, amongst a plurality of application servers, based on ICN capabilities, locations, and priorities of the plurality of application servers, and order of issuance of DNS queries corresponding to the plurality of application servers, according to embodiments as disclosed herein.

FIG. 6 illustrates an example scenario depicting the selection of an application server, amongst a plurality of application servers, based on ICN capabilities, locations, and priorities of the plurality of application servers, and order of issuance of DNS queries corresponding to the plurality of application servers. Consider that the processor 101*a* has sent DNS queries to the DNS server 102 to determine application servers that are capable of providing intended services using ICN. The DNS queries can be sent when an application is launched in the client device 101. The client device 101 is a UE (User Equipment).

As depicted in FIG. 6, the UE has received four DNS responses, indicating that four application servers are capable of providing the intended services. Based on the four DNS responses, received from the DNS server, the UE 101 can determine that three of the four DNS responses do not include IRP resource records. The UE 101 determines that one of the application servers is capable of providing the intended services using ICN. The processor 101*a* can select the application server capable of providing the intended services using ICN, amongst the application servers, to receive the services.

The UE 101 is configured to select the application server capable of providing the intended services using ICN. In case it is determined that multiple application servers are capable of providing the intended services using ICN, the UE 101 is configured to select the application server that is closest to the UE 101. If two application servers are in the same location, and are closest to the UE 101, the UE 101 is configured to select the application server that is having the higher priority. If the locations of the two application servers are identical and the respective priorities are same, the UE 101 can be configured to select the application server for which the DNS query was issued to the DNS server 102 first.

Once the appropriate application server has been selected by the UE, ICN connection can be established between the UE 101 and the selected application server. Herein, the UE had established two ICN connections with the application server to receive chat services and mail services.

FIG. 7 illustrates an example scenario depicting the determination of ICN capabilities of an application server based on values in the 'value' field of a TCP option in the header of a TCP packet, according to embodiments as disclosed herein. The TCP option is used for querying the application server about the ICN capabilities or parameters pertaining to the ICN capabilities of the application server. As depicted in FIG. 7, the embodiments can configure the TCP option 34 in the header field of the TCP packet for querying the application server about the ICN capabilities and the parameters pertaining to the ICN capabilities. The 'kind' and the 'length' fields comprises of 16 bits, wherein the 'kind' field represents bits 0-7 and the length field represents bits 8-15.

The 'kind' field specifies that TCP option 34 is being used for conveying to the application server that the client device 101 intends to determine whether the application server is having ICN capability. The 'value' field can specify whether the client device 101 is intending to determine the ICN capabilities or the parameters pertaining to the ICN capabilities of the application server. In an embodiment, the parameters include the ICN capability, ICN content name ICN mobility details, private use within ICN, and so on.

When the TCP packet is received by the application server, the application server can check the contents in the 'value' field of the TCP option 34. If the content in the 'value' field is 0x0, the application server determines that the client device 101 is intending to determine the ICN capabilities of the application server. If the content in the 'value' field is 0x1, the application server determines that the client device 101 is intending to determine the ICN content name. If the content in the 'value' field is 0x2, the application server determines that the client device 101 is intending to determine the ICN mobility details. If the content in the 'value' field is 0xF, the application server determines that the client device 101 is intending to establish ICN connection with the application server for private use. The client device 101 can set the content in the 'value' field to 0x3. However, the content 0x3 is reserved for future use.

The embodiments disclosed herein can be implemented through at least one software program running on at least one hardware device and performing network management functions to control the network elements. The network elements shown in FIG. 1B include blocks which can be at least one of a hardware device, or a combination of hardware device and software module.

The embodiments disclosed herein describe methods and systems for determining ICN capability of a node/server in a communication network, based on at least one of DNS resource record and TCP options. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, certain embodiments in accordance with this disclosure may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for determining information centric networking (ICN) capability of a server in a communication network, the method comprising:
    sending, by a client device, at least one domain name server (DNS) query comprising at least one ICN-resolution and path discovery (IRP) resource record, to a DNS server;
    receiving, by the client device, from the DNS server, at least one DNS response corresponding to the at least one DNS query; and
    determining, by the client device, that the server is capable of providing at least one service using ICN if the at least one DNS response includes the at least one IRP resource record.

2. The method of claim 1, wherein the at least one DNS query is sent by one of: at least one application in the client device or an application abstraction framework in the client device, wherein at least one change is introduced at an application level if the at least one application sends the at least one DNS query, wherein the at least one DNS query is sent in response to the at least one application being launched.

3. The method of claim 2, wherein the application abstraction framework determines whether the at least one application in the client device supports ICN, and
    connects the client device and the server.

4. The method of claim 2, wherein the at least one change introduced at the application level is a change in a socket call Application Programming Interface (API).

5. The method of claim 1, wherein the method further comprises:
    establishing, by the client device, a non-ICN link with the server, for data transfer between the client device and the server, if the at least one DNS response does not include the at least one IRP resource record.

6. The method of claim 1, wherein the method further comprises
    establishing, by the client device, an ICN link with the server, for data transfer between the client device and the server, if the at least one DNS response includes the at least one IRP resource record.

7. A client device, in a communication network, for determining information centric networking (ICN) capability of a server, the client device comprising:
    a memory; and
    at least one processor coupled to the memory, wherein the at least one processor is configured to:
    send at least one domain name server (DNS) query comprising at least one ICN-resolution and path discovery (IRP) resource record, to a DNS server;
    receive, from the DNS server, at least one DNS response corresponding to the at least one DNS query; and
    determine that the server is capable of providing at least one service using ICN, if the at least one DNS response includes the at least one IRP resource record.

8. The client device of claim 7, wherein the at least one DNS query is sent by one of: at least one application in the client device or an application abstraction framework in the client device, wherein at least one change is introduced at an application level if the at least one application sends the at least one DNS query, wherein the at least one DNS query is sent in response to the at least one application being launched.

9. The client device of claim 8, wherein the application abstraction framework:
    determines whether the at least one application in the client device supports ICN, and connects the client device and the server.

10. The client device of claim 8, wherein the at least one change introduced at the application level is a change in a socket call Application Programming Interface (API).

11. The client device of claim 7, wherein the at least one processor is further configured to establish a non-ICN link with the server, for data transfer between the client device and the server, if the at least one DNS response does not include the at least one IRP resource record.

12. The client device of claim 7, wherein the at least one processor is further configured to establish an ICN link with the server, for data transfer between the client device and the server, if the at least one DNS response includes the at least one IRP resource record.

13. A non-transitory computer readable medium for determining information centric networking (ICN) capability of a server, storing instructions, when executed by at least one processor of a client device, causing the client device to:
    send at least one domain name server (DNS) query comprising at least one ICN-resolution and path discovery (IRP) resource record, to a DNS server;
    receive from the DNS server, at least one DNS response corresponding to the at least one DNS query; and
    determine that the server is capable of providing at least one service using ICN if the at least one DNS response includes the at least one IRP resource record.

14. The non-transitory computer readable medium of claim 13, wherein the at least one DNS query is sent by one of: at least one application in the client device or an application abstraction framework in the client device, wherein at least one change is introduced at an application level if the at least one application sends the at least one DNS query, wherein the at least one DNS query is sent in response to the at least one application being launched.

15. The non-transitory computer readable medium of claim 14, wherein the application abstraction framework determines whether the at least one application in the client device supports ICN, and
    connects the client device and the server.

16. The non-transitory computer readable medium of claim 14, wherein the at least one change introduced at the application level is a change in a socket call Application Programming Interface (API).

17. The non-transitory computer readable medium of claim 13, further storing instructions, when executed by the at least one processor of the client device, causing the client device to:
   establish a non-ICN link with the server, for data transfer between the client device and the server, if the at least one DNS response does not include the at least one IRP resource record.

18. The non-transitory computer readable medium of claim 13, further storing instructions, when executed by the at least one processor of the client device, causing the client device to:
   establish an ICN link with the server, for data transfer between the client device and the server, if the at least one DNS response includes the at least one IRP resource record.

* * * * *